Figure 1:
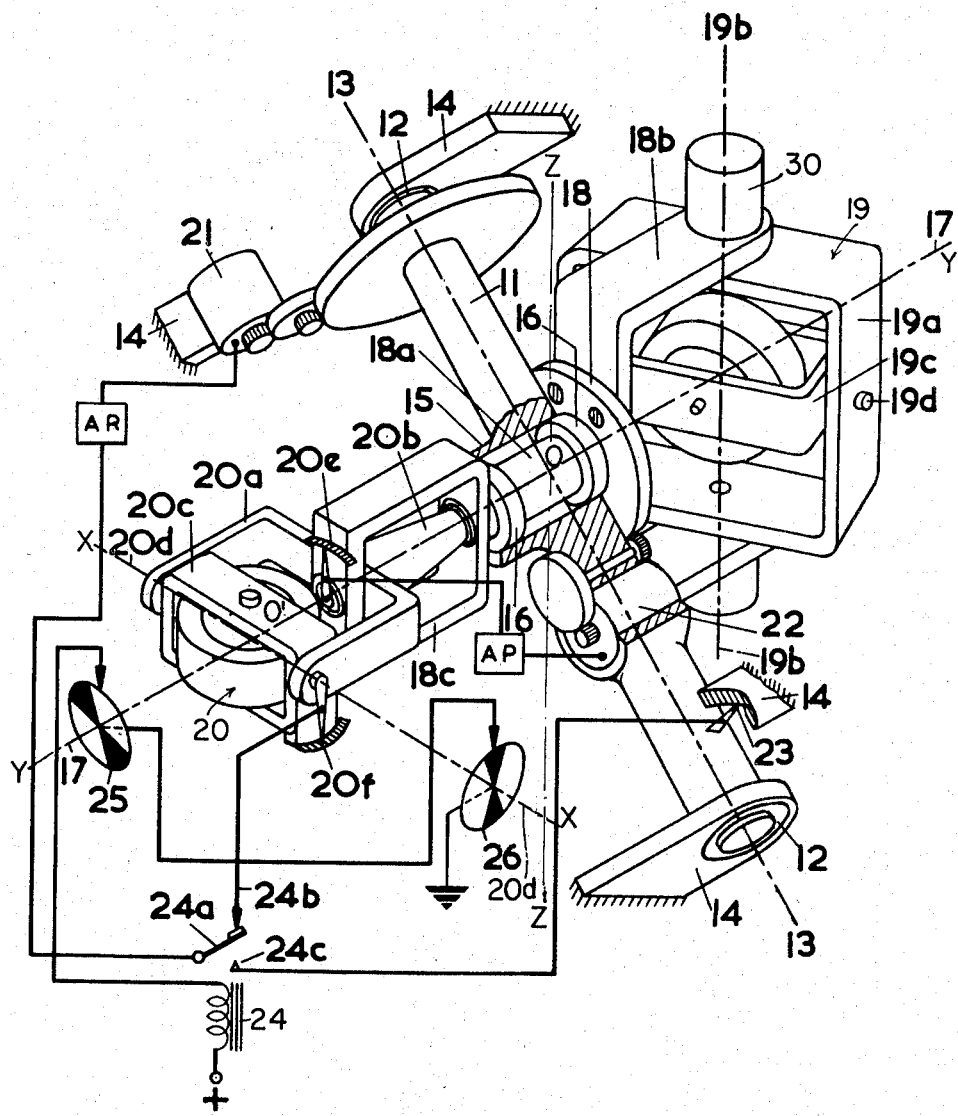

Aug. 25, 1959  J. W. BARNES  2,900,824
GYROSCOPE APPARATUS
Filed Aug. 9, 1956  2 Sheets-Sheet 1

Inventor
JEFFERY WALTON BARNES
By
Attorney

United States Patent Office 2,900,824
Patented Aug. 25, 1959

2,900,824
GYROSCOPE APPARATUS

Jeffery Walton Barnes, Farnborough, England, assignor to Minister of Supply in Her Majesty's Government of the United Kingdom of Great Britain and Northern Ireland, London, England Application August 9, 1956, Serial No. 603,130

Claims priority, application Great Britain August 9, 1955

16 Claims. (Cl. 74—5.34)

This invention relates to gyroscope apparatus of the kind in which a reference member or "platform" mounted on gimbals on a frame carries one or more gyroscopes with associated pick off devices that control the operation of means for positioning the platform about the axes of its gimbal mounting so that it may serve to afford attitude references.

The invention has for an object to provide improved gyroscope apparatus of this kind capable of operating for large deflections of the frame relative to the platform and, if desired, throughout 360 degrees deflection in any direction.

In gyroscope apparatus of the kind referred to according to the invention, whenever the frame or outer gimbal axis of the reference member or platform is parallel or within a given small angle from parallelism to the spin axis of a stabilizing attitude gyroscope on the platform, a motor which positions the platform about said outer gimbal axis is switched from control by a pick off on said gyroscope to control by a pick off effective about said outer gimbal axis whereby the platform is positioned about said outer gimbal axis with an inner gimbal axis of the platform in a predetermined fixed position relative to the frame, when a reference signal corresponding to that afforded by a pick off effective about said outer gimbal axis when said axis is remote from parallelism with the gyroscope spin axis may be taken from said pick off on said gyroscope.

Thus, a frame may have an outer gimbal pivotal thereon about an outer gimbal axis, this outer gimbal may have pivotal thereon about an inner gimbal axis an inner gimbal constituting the reference member or platform, and this inner gimbal or platform may have mounted thereon an attitude gyroscope having two degrees of freedom and whose one gimbal axis is parallel or coincident with said inner gimbal axis of the platform, a motor for positioning the outer gimbal of the platform about the outer gimbal axis relative to the frame being controlled by a pick off responsive about the other gimbal axis of the attitude gyroscope so long as said outer gimbal axis is in excess of a given small angle from parallelism with the spin axis of the attitude gyroscope, and said motor being controlled by a pick off responsive about said outer gimbal axis of the platform between the outer gimbal and the frame whenever the outer gimbal axis is within said given small angle from parallelism with the spin axis of the attitude gyroscope so that the outer gimbal member is then positioned about the outer gimbal axis with the inner gimbal axis in a given fixed position relative to the frame.

When the outer gimbal axis is within said given small angle from parallelism with the spin axis of the gyroscope, a reference signal corresponding to deflection of the frame about an axis extending at right angles to the inner gimbal axis (that is now fixed with respect to the frame) and at right angles or within a given small angle from a right angle to the outer gimbal axis, may be made available by a pick off associated with the attitude gyroscope and which is responsive about an appropriate gimbal axis of said gyroscope.

According to a feature of the invention, instead of employing conventional gimbal rings in apparatus employing two gyroscopes, the two gyroscopes are mounted on an inner gimbal member constituting a reference member or platform which extends from the one to the other and is, in its turn, mounted for rotation about an inner gimbal axis parallel to itself on an outer gimbal member which extends between said gyroscopes at right angles to the inner gimbal member.

In one arrangement of gyroscope apparatus according to the invention for affording azimuthal or compass and attitude references in an aircraft an azimuth gyroscope is mounted on the inner gimbal constituting a reference member or platform at one side of a fore and aft outer gimbal axis of said platform with a gimbal axis of said azimuth gyroscope fixed with respect to the inner gimbal or platform at right angles to the inner gimbal axis of the platform, and an attitude gyroscope having two degrees of freedom is mounted on the inner gimbal or platform at the other side of the outer gimbal axis with the one gimbal axis of said attitude gyroscope coincident or parallel with the inner gimbal axis of the platform, whilst a pick off effective about the other gimbal axis of the attitude gyroscope controls a motor for rotating the outer gimbal of the platform about the outer gimbal axis of the platform and a pick off effective about said one gimbal axis of the attitude gyroscope controls a motor for rotating the inner gimbal member or platform about the inner gimbal member axis to stabilize the inner gimbal member or platform with its inner gimbal axis horizontal and said azimuth gyroscope gimbal axis vertical; and during "steep flight," i.e. nose-up or nose down attitudes displaced from the vertical by less than say 15 degrees in pitch about the aircraft OY or wing axis and/or in yaw about the aircraft OZ or fin axis, the motor for rotating the outer gimbal member about the outer gimbal axis is switched for control by a pick off effective about the outer gimbal axis, of the platform whereby the inner gimbal or platform is positioned with the inner gimbal axis parallel with the aircraft OY or "wing" axis.

The switching may be effected automatically by means including two series connected switches, the one operative about the inner gimbal axis of the inner gimbal member or platform between the inner gimbal or platform and the attitude gyroscope and the other operative about an appropriate gimbal axis of the attitude gyroscope.

Preferably, provision is made for reversing the direction of rotation of the inner gimbal member or platform about the inner gimbal axis under the control of the pick off effective about the appropriate gimbal axis of the attitude gyroscope whenever the outer gimbal axis passes through the vertical plane containing the inner gimbal axis.

Such provision may include a switch operative about the inner gimbal axis between the inner gimbal or platform and the attitude gyroscope, said switch being open for pitch attitudes of an aircraft in which the apparatus is installed about its OY or "wing" axis between 90 and 270 degrees and closed for pitch attitudes from 270 degrees through 360 or 0 degrees to 90 degrees.

Figure 2:
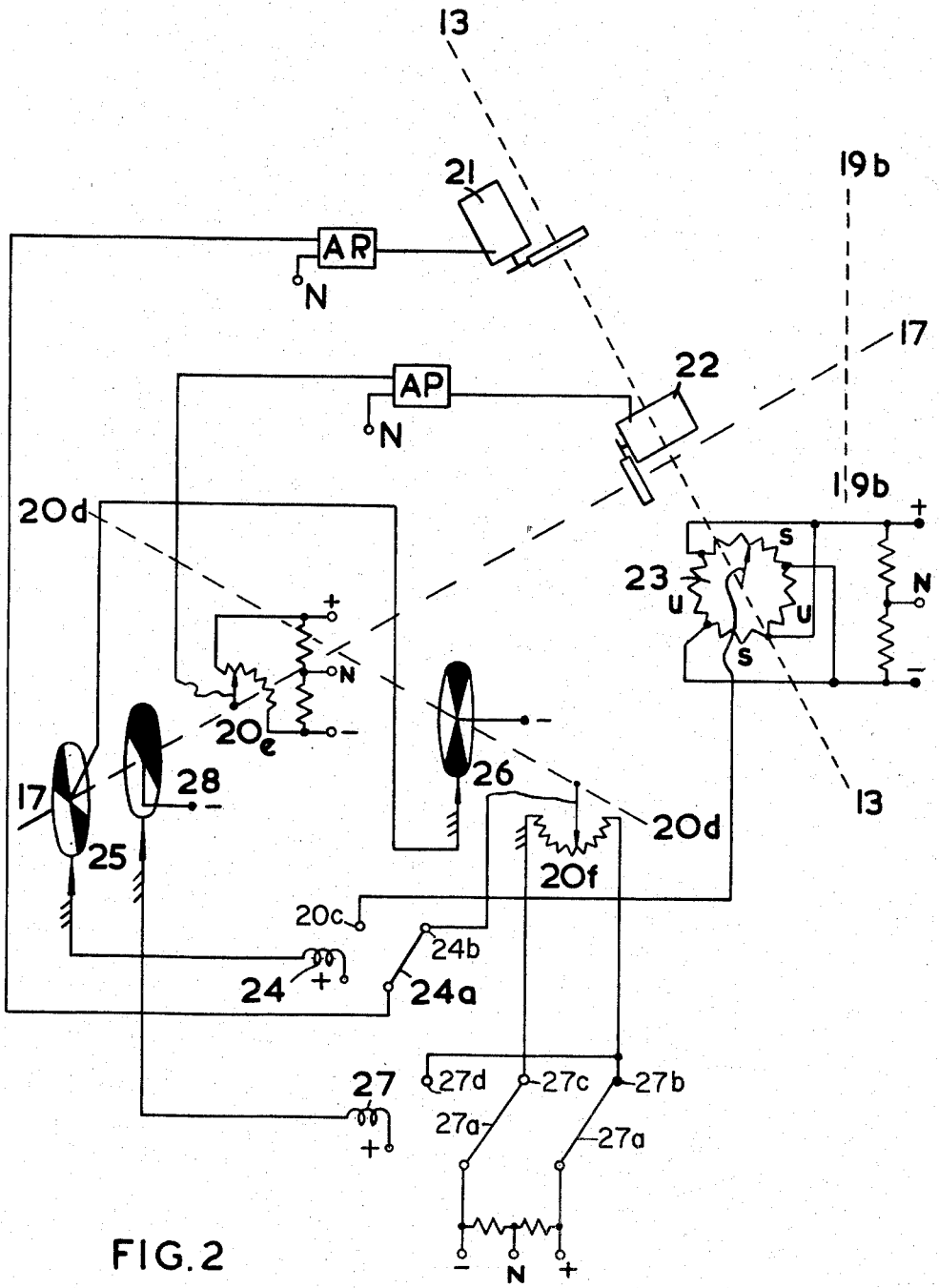

The invention is illustrated by the accompanying diagrammatic drawings of which:

Figure 1 is a perspective view showing one way of mounting an azimuth gyroscope and an attitude gyroscope in an apparatus for affording references throughout 360 degrees in azimuth, pitch and roll and Figure 2 is a circuit diagram.

As shown in Figure 1, a shaft-like outer gimbal member 11 is carried by outer gimbal bearings 12, 12, whose axis is indicated at 13—13, in a frame of which parts only are shown at 14. The OZ axis represents the fin axis when the aircraft is level or flat. This outer gimbal member 11 is formed with a drilled boss 15 containing inner gimbal bearings 16, 16, whose axis is indicated at 17—17 and intersects the axis 13—13 at right angles carrying an inner gimbal member 18 constituting a reference member, of which a shaft-like central portion 18a extends through said bearings 16, 16 and has secured rigidly to one (R.H. as shown) end thereof a frame member 18b for an azimuth gyroscope 19 and to the other (L.H. as shown) end thereof a frame member 18c for an attitude gyroscope 20.

The azimuth gyroscope 19 has an outer gimbal ring 19a pivotal on the azimuth gyroscope frame member 18b and is provided with a pick off 30 which senses movement about an outer gimbal axis 19b—19b, which intersects the axis 17—17 of the inner gimbal member 18 at right angles and an inner gimbal ring 19c pivotal on the outer gimbal ring 19a about an inner gimbal axis indicated at 19d.

The attitude gyroscope 20 has an outer gimbal yoke 20a having a stem 20b which is journalled on the attitude gyroscope frame member 18c so that the outer gimbal axis of the attitude gyroscope is coincident with the axis 17—17 of the inner gimbal member 18, and an inner gimbal ring 20c pivotal on the outer gimbal yoke 20a about an inner gimbal axis 20d—20d.

An outer gimbal member motor 21 on the frame 14 with an associated gear train is provided for rotating the outer gimbal member 11 about the outer gimbal axis 13—13 and an inner gimbal member motor 22 on the outer gimbal member 11 with associated gear train is provided for rotating the inner gimbal member 18 about the inner gimbal axis 17—17.

A pitch pick-off 20e is responsive about the outer gimbal axis of the attitude gyroscope i.e. the axis 17—17 of the inner gimbal member 18, and a roll/yaw pick-off 20f is responsive about the inner gimbal axis 20d—20d of the attitude gyroscope.

An outer gimbal member pick-off 23 between the frame 14 and the outer gimbal member 11 is responsive to rotation of said outer gimbal member 11 about the outer gimbal axis 13—13.

In use the apparatus is installed in an aircraft with the axis 13—13 of the outer gimbal member 11 extending fore and aft.

In "normal" flight, that is for nose-up or nose-down attitudes displaced from the vertical by more than say 15 degrees in pitch about the aircraft OY or "wing" axis and/or in yaw about the aircraft OZ or "fin" axis, a signal from the roll/yaw pick off 20f is used in conjunction with an amplifier indicated at AR to operate the outer gimbal motor 21 to maintain the inner gimbal member 18 with its axis 17—17 horizontal.

In normal flight and also in steep flight, that is for flight in any attitude, a signal from the pitch pick-off 20e is used in conjunction with an amplifier AP to operate the inner gimbal member motor 22 and so to maintain the azimuth gyroscope outer gimbal axis 19b—19b vertical when the axis 17—17 of the inner gimbal member 18 is horizontal, and in a vertical plane containing the axis 17—17 when said axis 17—17 is not horizontal.

In "steep" flight, that is for nose-up or nose-down attitudes displaced from the vertical by less than say 15 degrees in pitch about the aircraft OY or wing axis and/or in yaw about the aircraft OZ or fin axis, the outer gimbal member motor 21 is switched for control by the outer gimbal member pick off 23 so as to position the axis 17—17 of the inner gimbal member 18 parallel with the aircraft OY or wing axis. This switching of the outer gimbal member motor 21 is effected automatically by means of an outer gimbal motor relay 24 whose winding is connected in series with a pitch commutator-and-brush switch 25 having two diametrically opposed say 30 degree conductive segments operative about the inner gimbal axis 17—17 between the outer gimbal member 11 and the inner gimbal member 18 and a roll/yaw commutator-and-brush switch 26 also having two diametrically opposed say 30 degree conductive segments operative about the attitude gyroscope inner gimbal axis 20d—20d between the outer gimbal yoke 20a and the inner gimbal ring 20c, of said gyroscope.

When the relay 24 is not energised its moving contact 24a engages the fixed contact 24b thereof as shown and so connects the roll/yaw pick off 20f to the amplifier AR to operate the outer gimbal member motor 21. When the relay 24 is energised, however, its moving contact 24a engages the other fixed contact 24c thereof and so connects the outer gimbal member pick off 23 to the amplifier AR to operate the outer gimbal member motor 21.

The pitch switch 25 is arranged so that its brush engages one or other of its conductive segments whenever the aircraft attitude in pitch about the aircraft OY or wing axis is displaced nose up or nose down from the vertical by less than say 15 degrees, and the roll/yaw switch 26 is arranged so that its brush engages one or the other of its segments at all times except as and when the aircraft changes from steep flight to normal flight by yawing about its OZ or fin axis.

Referring now to Figure 2, the pitch pick off 20e is of simple potentiometer type producing a signal in the well known manner between its wiper arm and a neutral or return point at the junction of two equal resistances which are connected in series with one another across the same D.C. source as the resistance element of the potentiometer. This pick off 20e is connected at all times to the amplifier AP for operating the inner gimbal member motor 22.

The roll/yaw pick off 20f is also of simple potentiometer type but its signal is reversed as the aircraft pitches about its OY or wing axis through 90 degrees and 270 degrees to the horizontal. This switching is effected automatically by means of a pitch pick off relay 27 whose winding is connected in series with a second pitch commutator-and-brush switch 28 having a single 180 degrees conductive segment, operative about the inner gimbal axis 17—17 between the outer gimbal member 11 and the inner gimbal member 18. When the relay 27 is not energised, its moving contacts 27a engage stationary contacts 27b, 27c to connect the resistance element of the roll/yaw potentiometer 20f in the one sense with a D.C. source and when the relay 27 is energised said contacts 27a engage stationary contacts 27c, 27d to connect said element in the reverse sense. The second pitch switch 28 is arranged so that its brush is in engagement with the 180 degree conductive segment when the aircraft pitch attitude about the OY or wing axis is between 0 and 90 degrees and 270 to 360 (i.e. 0) degrees to the horizontal.

The outer gimbal member pick off 23 is of known more complex form in which a wiper arm transverses an annular resistance element of which two diametrically opposite points are connected to the one side and two further points at the ends of an intermediate diameter at 90 degrees are connected to the other side of the D.C. source, across which latter are connected two equal resistors affording at their junction a neutral or return point between which and the wiper arm the signal from the pick off 23 appears.

The opposite resistance element quadrants indicated at S, S are "stable" and those indicated at U, U are "unstable" in the sense that if, for example, the wiper is displaced, relative to the annular resistance element, from the null position shown but is still on the corresponding stable quadrant S when the relay 24 connects it to operate the outer gimbal motor 21, it will cause the motor 21 to rotate in such sense as to cancel said displacement, but, if when the relay 24 so connects the pick off 23 the wiper is on either of the unstable quadrants U, U the motor 21 will turn the outer gimbal member 11 about the axis 13—13 in such sense as to bring the wiper arm on to whichever of the two stable sections, S, S, is the nearer.

For the purpose of explaining the operation of the apparatus its performance during four selected illustrative but not necessarily practical manoeuvres will now be described.

First, a half loop with wings level from horizontal flight right way up. At the beginning of this manoeuvre the axis 13—13 of the outer gimbal member 11 is substantially horizontal fore and aft and the axis 17—17 of the inner gimbal member 18 is horizontal athwartships with the azimuth gyroscope outer gimbal axis 19b—19b vertical. The relay 24 is not energised because although the roll/yaw switch 26 is closed the pitch switch 25 is open. There is zero signal at the roll/yaw pick off 20f and zero signal at the pitch pick off 20e. The second pitch switch 28 is open.

As the aircraft pitches nose up the corresponding end (shown uppermost in Figure 1) of the outer gimbal member 11 rises and initially rotates the inner gimbal member 18 with it. This however immediately causes the pitch pick off 20e to produce a signal as a result of which the inner gimbal motor 22 rotates the inner gimbal member 18 relative to the aircraft in the opposite sense. Thus the azimuth gyroscope outer gimbal axis 19b—19b is maintained vertical throughout the half loop manoeuvre.

Because the wings remain level the signal from the roll pick off 20f remains zero.

As the pitch attitude about the horizontal OY or wing axis passes through 75 degrees to the horizontal, the pitch switch 25 closes and, because the roll/yaw switch 26 is already closed and remains so, the relay 24 is energised and so the roll/yaw pick off 20f is disconnected and the outer gimbal member pick off 23 is connected to the amplifier AR to operate the outer gimbal member motor 21. There is zero signal at this pick off 23 and the axis 17—17 of the inner gimbal member 18 continues horizontal and parallel with the wings.

As the pitch attitude about the horizontal OY or wing axis passes through 90 degrees to the horizontal (when the bank angle about the aircraft O'X or fuselage axis with respect to the horizontal changes instantaneously through 180 degrees) the second pitch switch 28 closes and so the relay 27 is energised and its moving contacts 27a reverse the connection of the resistance element of the roll/yaw pick off 20f to the D.C. source.

As the pitch attitude about the horizontal OY or wing axis passes through 105 degrees to the horizontal, the pitch switch 25 opens and the roll/yaw pick off 20f is connected to the amplifier AR to operate the outer gimbal member motor 21 once again.

At the end of the half loop manoeuvre the outer gimbal member 11 has moved with the aircraft through 180 degrees about the axis 17—17 of the inner gimbal member 18 and said member 18 has been moved relative to the aircraft and the outer gimbal member 11, through 180 degrees in the opposite sense so that the azimuth gyroscope outer gimbal axis 19b—19b is still vertical.

It is to be noted here that as a result of the 180 degree movement, with the aircraft, of the outer gimbal member 11 about the inner gimbal axis 17—17, the outer gimbal member motor 21 is reversed end for end, so that but for the above described reversal (at the 90 degrees pitch position) of the supply connections the roll/yaw pick off 20f would now cause the outer gimbal member motor 21 to operate in the wrong sense.

Second, a half roll in horizontal flight from the wings level right way up attitude. The state of affairs at the beginning of this manoeuvre is the same as for the first manoeuvre described above.

As the aircraft rolls say right-wing-up, the outer gimbal member 11 initially rotates with it. This, however, immediately causes the roll/yaw pick off 20f to produce a signal, as a result of which the outer gimbal motor 21 rotates the outer gimbal member 11 relative to the aircraft in the opposite sense. Thus, the axis 17—17 of the inner gimbal member 18 is maintained horizontal throughout the half roll manoeuvre. The azimuth gyroscope outer gimbal axis 19b—19b is maintained vertical throughout the manoeuvre by the pitch pick off 20e and it will be seen that whereas at the beginning of the half roll the azimuth gyroscope is at the same side of the outer gimbal member as the starboard wing, at the end of the half roll the azimuth gyroscope is at the same side of the outer gimbal member 11 as the port wing of the aircraft.

Third, attitude change in yaw about the aircraft OZ or fin axis with said axis horizontal, from more than 15 degrees from the vertical nose up on one heading to more than 15 degrees from the vertical nose up on the opposite heading.

At the beginning of this manoeuvre, the aircraft is in a bank attitude of 90 degrees about the aircraft OX or fuselage axis and the outer gimbal member 11 is therefore displaced (by the motor 21) relative to the aircraft by the same angle but in the opposite sense, so that the outer gimbal member pick off 23 is positioned to afford a corresponding signal; but, the pitch switch 25 is open and therefore the relay 24 is not energised and the roll/yaw pick off 20f (not said outer gimbal member pick-off 23) is operating the outer gimbal member motor 21 to maintain the axis 17—17 of the inner gimbal member 18 horizontal. So long as the yaw attitude about the horizontal aircraft OZ or fin axis is more than 15 degrees from the vertical the yaw manoeuvre does not disturb such horizontality of the axis 17—17, but the outer gimbal member 11, moving with the aircraft, initially moves the inner gimbal member 18 about its axis 17—17 and so produces a signal at the pitch pick off 20e as a result of which the inner gimbal motor 22 rotates the inner gimbal member 18 relative to the aircraft in the opposite sense and so maintains the azimuth gyroscope outer gimbal axis 19b—19b vertical as in the first manoeuvre described above.

As the yaw attitude about the horizontal aircraft OZ or fin axis increases through 75 degrees to the horizontal the pitch switch 25 closes and, because (as in the first manoeuvre described above) the roll/yaw switch 26 is already closed and remains so, the relay 24 is energised and so the roll pick off 20f is disconnected and the outer gimbal member pick off 23 is connected to operate the outer gimbal member motor 21. In this case, however, there is now at the outer gimbal member pick off 23, as already stated, a signal corresponding to 90 degrees displacement of the aircraft in roll about its fuselage or O'X axis and this signal at once or almost at once operates the outer gimbal member motor 21 to rotate the outer gimbal member 11 through 90 degrees until the signal at said pick off 23 is zero so bringing the axis 17—17 of the inner gimbal member 18 parallel with the aircraft OY or wing axis and maintaining it so as the yaw manoeuvre continues in the steep flight zone. At precisely 90 degrees of roll there is in fact zero signal at the outer gimbal member pick off 23 because its wiper arm is then on the neutral point of one of the unstable quadrants U.U of its annular resistance element, but in practice precisely 90 degrees of roll can only occur instantaneously.

As the yaw attitude about the horizontal OZ or fin axis passes through 105 degrees to the horizontal, however, the roll/yaw switch 26 opens and so the relay 24 is de-energised, the outer gimbal member pick off 23 is disconnected and the roll/yaw pick off 20f is again connected to operate the outer gimbal member motor 21. At the moment of its reconnection the roll/yaw pick off 20f produces a signal corresponding to the then 15 degrees displacement (parallel to the wings) from the horizontal of the axis 17—17 of the inner gimbal member 18, and so the outer gimbal member motor 21 rotates the outer gimbal member 11 (actually through 90 degrees) until the inner gimbal member 18 is again horizontal.

Fourth a flat half turn right way up.

At the beginning of this manoeuvre the state of affairs is the same as at the beginning of the first and second manoeuvres described above.

As the aircraft yaws about its now vertical OZ or fin axis, the signals at the pitch pick off 20e and the roll/yaw pick off 20f remain zero and the inner gimbal member 11 is maintained horizontal with the azimuth gyroscope outer gimbal axis vertical.

It is to be noted that at the end of this very simple fourth manoeuvre the aircraft is flying straight and level on the opposite heading to that on which it started the manoeuvre and that the azimuth gyroscope is at the same side of the outer gimbal member axis 13—13 as the one, say starboard, wing both at the beginning and at the end of the manoeuvre.

It is further to be noted, however, that the same change of heading alone through 180 degrees may result from the execution of a half loop with wings level (first manoeuvre described above) followed by a half roll (like the second manoeuvre described above). In this case, however, if the azimuth gyroscope is at the same side of the outer gimbal member axis 13—13 as the one say starboard wing, at the beginning of the half loop, said gyroscope will be at the same side of the outer gimbal axis 13—13 as the other, say port wing at the end of the half roll on the opposite heading, and vice versa.

The means employed for connecting indicators or other devices to the apparatus for operation or control thereby must, therefore, allow for the fact that at any given time the azimuth gyroscope may be disposed at the same side of the outer gimbal axis 13—13 as either the starboard or the port wing.

It will be seen that:

(1) The angular position of the inner gimbal member 18, with respect to the azimuth gyroscope about its outer gimbal axis 19b—19b is a measure of azimuth (about the vertical). This measure which holds for both normal and steep flight, is, in common with other azimuthal references 180 degrees in error when the aircraft is wrong way up.

Apart from this the measure is correct when the azimuth gyroscope is at the same side of the outer gimbal member 11 as the one, say starboard, wing, but 180 degrees in error when said gyroscope is at the same side of said outer gimbal member 11 as the other, say port, wing.

(2) The angular position, of the outer gimbal member 11, with respect to the inner gimbal member 18 about its axis 17—17 is a measure of aircraft pitch attitude (about the OY or wing axis). This measure holds for both normal and steep flight.

However, this measure is correct when the azimuth gyroscope is at the same side of the outer gimbal member 11 as the one, say starboard, wing, but in error when the said gyroscope is at the same side of said member 11 as the other, say port, wing. In this case the error is zero for 90 degrees and 270 degrees pitch attitudes. For zero degrees and 180 degrees pitch attitudes the error is 180 degrees and for intermediate pitch attitudes the erroneous measures are "mirror images" of the corresponding true measures, e.g. for a pitch attitude of 10 degrees the erroneous measure is 170 degrees, i.e. an error of 160 degrees.

(3) The angular position, of the frame 14, with respect to the outer gimbal member 11 about its axis 13 is a measure of the aircraft roll attitude (about the O'X or fuselage axis). This measure holds for normal flight but the azimuth measure of (1) above corresponds to aircraft roll (about the O'X or fuselage axis) in steep flight. As in (1) above, the measure is correct or 180 degrees in error according as the azimuth gyroscope is at the same side of the outer gimbal member 11 as the one, say starboard, or the other say port, wing.

(4) The angular position, of the inner gimbal member 18, with respect to the attitude gyroscope about the inner gimbal axis 20d—20d of said gyroscope is a measure of the aircraft yaw attitude (about the OZ or fin axis) for steep flight, but in view of (3) above is not needed for aircraft roll (about the O'X or fuselage axis) in normal flight. As in (1) and (3) above, this measure is correct or 180 degrees in error according as the azimuth gyroscope is at the same side of the outer gimbal member 11 as the one, say the starboard, or the other, say the port, wing.

Where synchros are used for connecting indicators or other devices to the apparatus for operation or control thereby, 180° errors as in (1), (3) and (4) above can be corrected by switch gear for reversing the leads from say the transmitting synchro to a power supply common to both the transmitting and the receiving synchros. Similarly, mirror image errors as in (2) above can be allowed for by switch gear for reversing two of the three leads joining the stators of the corresponding transmitting and receiving synchros.

It will be apparent, however, that provision can be made for correcting the errors in question when other means than synchros are used for connecting indicators or other devices to the reference apparatus.

I claim:

1. Gyroscope apparatus comprising a gimbal mounted attitude reference member, an attitude gyroscope on said reference member, motor means for positioning the reference member about an outer gimbal axis of its mounting, a pick off responsive to movement of the reference member about said outer gimbal axis and switch means operative to connect the motor means for control by said gyroscope so long as said outer gimbal axis is in excess of a given small angle from parallelism with the spin axis of the attitude gyroscope, and to connect the motor means for control by said outer gimbal axis pick off and so cause the reference member to be positioned and held in a given fixed position about the outer gimbal axis when the outer gimbal axis is within said given small angle from parallelism with the spin axis of the attitude gyroscope.

2. Gyroscope apparatus as claimed in claim 1, in which the switch means comprise first switch means responsive to relative movement between the reference member and a gimbal of the attitude gyroscope about the inner gimbal axis of the attitude gyroscope, in series connection with second switch means responsive to movement of said reference member about its inner gimbal axis.

3. Gyroscope apparatus as claimed in claim 2 having third switch means including a pick off responsive to movement of the reference member outer gimbal relative to the attitude gyroscope about the reference member inner gimbal axis to reverse the direction of said latter pick off whenever said reference member outer gimbal axis passes through the vertical plane containing the reference member inner gimbal axis.

4. Gyroscope apparatus as claimed in claim 3 in which said third switch means responsive to relative movement between the reference member outer gimbal and the attitude gyroscope about the reference member inner gimbal axis are open for pitch attitudes of an aircraft in which the apparatus is installed about its OY or "wing" axis between 90 and 270 degrees to the horizontal and closed for pitch attitudes from 270 through 360 or 0 degrees to 90 degrees to the horizontal.

5. Gyroscope apparatus as claimed in claim 3 having pick off means responsive to the angular position of the azimuth gyroscope relative to the reference member about the azimuth gyroscope outer gimbal axis for providing azimuth signals.

6. Gyroscope apparatus comprising a reference member, an outer gimbal member, bearing means supporting said reference member on said outer gimbal member for angular movement about an inner gimbal axis, a frame supporting said outer gimbal member for angular movement about an outer gimbal axis, an attitude gyroscope and an azimuth gyroscope mounted on the reference member at opposite sides respectively of the outer gimbal axis, the inner gimbal member extending in the direction of the inner gimbal axis from the one of said gyroscopes to the other, the outer gimbal member extending in the direction of the outer gimbal axis between the two gyroscopes, said reference member bearing means being located between the two gyroscopes, switch means comprising first switch means responsive to relative movement between the reference member and a gimbal of the attitude gyroscope about the inner gimbal axis of the attitude gyroscope, in series connection with second switch means responsive to movement between the reference member and the outer gimbal member.

7. Gyroscope apparatus as claimed in claim 6 having third switch means and a pick off responsive to movement of the reference member outer gimbal about the reference member inner gimbal axis to reverse the direction of rotation of said latter pick off whenever said reference member outer gimbal axis passes through the vertical plane containing the reference member inner gimbal axis.

8. Gyroscope apparatus as claimed in claim 7 in which switch means responsive to relative movement between the reference member outer gimbal and the attitude gyroscope about the reference member inner gimbal axis are open for pitch attitudes of an aircraft in which the apparatus is installed about its OY or "wing" axis between 90 and 270 degrees to the horizontal and closed for pitch attitudes from 270 through 360 or 0 degrees to 90 degrees to the horizontal.

9. Gyroscope apparatus as claimed in claim 7 having pick off means responsive to the angular position of the azimuth gyroscope relative to the reference member about the azimuth gyroscope outer gimbal axis for providing azimuth signals.

10. Gyroscope apparatus as claimed in claim 9, said pick off means associated with said third switch means being responsive to movement of the reference member outer gimbal relative to the reference member inner gimbal about the inner gimbal axis for providing pitch signals, said third switch means also being operative to change the connections to said pick off means whenever the reference member outer gimbal axis passes through the vertical plane containing the reference member inner gimbal axis to prevent the inclusion of mirror image errors in said pitch signals which would otherwise occur.

11. Gyroscope apparatus as claimed in claim 10 having bank pick off means responsive to relative movement between the reference member outer gimbal and the airframe of an aircraft in which the apparatus is mounted about the outer gimbal axis to provide bank signals corresponding to the rotation of the aircraft OY or "wing" axis about the O'X or fore and aft axis so long as the outer gimbal axis is in excess of a given small angle from parallelism with the spin axis of the attitude gyroscope and in which said third switch means is also operative to change the connections to said bank pick off means whenever the reference member outer gimbal axis passes through the vertical plane containing the reference member inner gimbal axis to prevent the inclusion of 180 degrees errors in said bank signals which would otherwise occur and switch means is operative to disconnect said bank pick off means whenever the outer gimbal axis is within the given small angle from parallelism with the spin axis of the attitude gyroscope.

12. Gyroscope apparatus as claimed in claim 11 in which pick off means responsive to relative movement between the inner and outer gimbals of the attitude gyroscope provide signals which correspond substantially to yawing of the aircraft about its OZ or fin axis when the outer gimbal axis is within said given small angle from parallelism with the spin axis of the attitude gyroscope.

13. Gyroscope apparatus comprising a gimbal mounted attitude reference member, an attitude gyroscope on said reference member, motor means for positioning the reference member about an outer gimbal axis of its mounting, a pick off responsive to movement of the reference member about said outer gimbal axis, switch means operative to connect the motor means for control by said gyroscope so long as said outer gimbal axis is in excess of a given small angle from parallelism with the spin axis of the attitude gyroscope, and to connect the motor means for control by said outer gimbal axis pick off and so cause the reference member to be positioned and held in a given fixed position about the outer gimbal axis when the outer gimbal axis is within said given small angle from parallelism with the spin axis of the attitude gyroscope, said switch means comprising first switch means responsive to relative movement between the reference member and a gimbal of the attitude gyroscope about the inner gimbal axis of the reference member, in series connection with second switch means responsive to movement of said reference member about its inner gimbal axis, third switch means and a pick off responsive to movement of the reference member outer gimbal relative to the attitude gyroscope about the reference member inner gimbal axis to reverse the direction of said latter pick off whenever said reference member outer gimbal axis passes through the vertical plane containing the reference member inner gimbal axis, said third switch means being open for pitch attitudes of an aircraft in which the apparatus is installed about its wing axis between 90 and 270 degrees to the horizontal and closed for pitch attitudes from 270 through 90 degrees to the horizontal; and pick off means responsive to the angular position of the azimuth gyroscope relative to the reference member about the azimuth gyroscope outer gimbal axis for providing azimuth signals.

14. The gyroscope apparatus of claim 13 including a pick off means responsive to movement of the reference member outer gimbal relative to the reference member inner gimbal about the inner gimbal axis for providing pitch signals and in which said third switch means are also operative to change the connections to said latter pick off means whenever the reference member outer gimbal axis passes through the vertical plane containing the reference member inner gimbal axis to prevent the inclusion of mirror image errors in said pitch signals which would otherwise occur.

15. The apparatus of claim 14 and a bank pick off means responsive to relative movement between the reference member outer gimbal and the airframe of an aircraft in which the apparatus is mounted about the outer gimbal axis to provide bank signals corresponding to the rotation of the aircraft wing axis about the longitudinal axis so long as the outer gimbal axis is in excess of a given small angle from parallelism with the spin axis of the attitude gyroscope and in which said third switch means is also operative to change the connections to said bank pick off means whenever the reference member outer gimbal axis passes through the vertical plane containing the reference member inner gimbal axis to prevent the inclusion of 180 degree errors in said bank signals which would otherwise occur.

16. The apparatus of claim 15 in which pick off means responsive to relative movement between the inner and outer gimbals of the attitude gyroscope provide signals which correspond substantially to yawing of the aircraft about its fin axis when the outer gimbal axis is within said given small angle from parallelism with the spin axis of the attitude gyroscope.

References Cited in the file of this patent

UNITED STATES PATENTS

| | | |
|---|---|---|
| 2,409,875 | Martin | Oct. 22, 1946 |
| 2,469,782 | Phair | May 10, 1949 |
| 2,595,951 | Konet et al. | May 6, 1952 |